(12) United States Patent
Cook et al.

(10) Patent No.: US 9,329,996 B2
(45) Date of Patent: May 3, 2016

(54) BRANCH CIRCUIT MONITOR WITH PAGING REGISTER

(75) Inventors: Martin Cook, Tigard, OR (US); Michael Bitsch, Hillsboro, OR (US)

(73) Assignee: Veris Industries, LLC, Tualatin, OR (US)

( * ) Notice: Subject to any disclaimer, the term of this patent is extended or adjusted under 35 U.S.C. 154(b) by 195 days.

(21) Appl. No.: 13/406,779

(22) Filed: Feb. 28, 2012

(65) Prior Publication Data

US 2012/0278562 A1    Nov. 1, 2012

Related U.S. Application Data

(60) Provisional application No. 61/479,549, filed on Apr. 27, 2011.

(51) Int. Cl.
*G06F 12/00* (2006.01)
*G06F 12/06* (2006.01)
*G06F 12/02* (2006.01)

(52) U.S. Cl.
CPC ............ *G06F 12/0623* (2013.01); *G06F 12/02* (2013.01); *G06F 12/06* (2013.01)

(58) Field of Classification Search
CPC . G06F 12/1027; G06F 12/10; G06F 12/1036; G06F 12/1009; G06F 12/145; G06F 12/0246; G06F 9/5077; G06F 9/30101; G06F 9/384; G06F 2212/656; G06F 13/404; G06F 12/109; G06F 2009/45583; G06F 12/0245; G06F 3/064; G06F 3/0679; G06F 9/355; G06T 1/60
USPC .......... 711/154, E12.001, 207, 206, E12.061, 711/202, 203, 6, E12.065, E12.068, 205, 711/E12.059, E12.058, 170, E12.008, 128, 711/173, 208, 220, E12.095, E12.017, 103, 711/209, 163, E12.014, 200
See application file for complete search history.

(56) References Cited

U.S. PATENT DOCUMENTS

| | | |
|---|---|---|
| 1,100,171 A | 6/1914 | Brown |
| 1,455,263 A | 5/1923 | Oberfell |
| 1,569,723 A | 1/1926 | Dickinson |
| 1,800,474 A | 4/1931 | Scherer |
| 1,830,541 A | 11/1931 | Harris |
| 1,871,710 A | 8/1932 | Lenehan |

(Continued)

FOREIGN PATENT DOCUMENTS

| | | |
|---|---|---|
| EP | 1531334 A2 | 5/2005 |
| JP | 5083776 | 4/1993 |

OTHER PUBLICATIONS

AT91M42800A Summary, "AT91 ARM Thumb Microcontrollers," Atmel, Feb. 2002.

(Continued)

*Primary Examiner* — Tuan Thai
*Assistant Examiner* — Edward Waddy, Jr.
(74) *Attorney, Agent, or Firm* — Chernoff Vilhauer McClung & Stenzel, LLP

(57) ABSTRACT

The quantity of data stored in a branch circuit monitor and accessible by a data processing network is increased by logically dividing the monitor's memory into a plurality of registers each comprising a plurality of pages and addressing a page containing the desired data with an address corresponding to the identity of a page number stored in a page register and the identity of the register.

6 Claims, 4 Drawing Sheets

(56) References Cited

U.S. PATENT DOCUMENTS

| | | | |
|---|---|---|---|
| 2,059,594 A | 11/1936 | Massa, Jr. |
| 2,411,405 A | 11/1946 | Yuhas |
| 2,412,782 A | 12/1946 | Palmer |
| 2,428,613 A | 10/1947 | Boyajian |
| 2,428,784 A | 10/1947 | Cole |
| 2,512,070 A | 6/1950 | Nelson et al. |
| 2,663,190 A | 12/1953 | Ilgenfritz |
| 2,746,295 A | 5/1956 | Lubkin |
| 2,802,182 A | 8/1957 | Godshalk et al. |
| 2,852,739 A | 9/1958 | Hansen |
| 2,943,488 A | 7/1960 | Strobel et al. |
| 3,190,122 A | 6/1965 | Edwards |
| 3,243,674 A | 3/1966 | Ebert |
| 3,287,974 A | 11/1966 | Ciemochowski |
| 3,374,434 A | 3/1968 | Perry |
| 3,493,760 A | 2/1970 | Hoadley |
| 3,512,045 A | 5/1970 | Sanger et al. |
| 3,584,294 A | 6/1971 | Siwko |
| 3,593,078 A | 7/1971 | Dornshy et al. |
| 3,696,288 A | 10/1972 | Carman |
| 3,728,705 A | 4/1973 | Atkins |
| 3,769,548 A | 10/1973 | Pardue |
| 3,772,625 A | 11/1973 | Raupach |
| 3,861,411 A | 1/1975 | Mitchell et al. |
| 3,955,701 A | 5/1976 | Fisch |
| 3,976,924 A | 8/1976 | Vanjani |
| 4,001,647 A | 1/1977 | Klein et al. |
| 4,001,758 A | 1/1977 | Esper et al. |
| 4,007,401 A | 2/1977 | Kimmel et al. |
| 4,030,058 A | 6/1977 | Riffe et al. |
| 4,048,605 A | 9/1977 | McCollum |
| 4,096,436 A | 6/1978 | Cook et al. |
| 4,107,519 A | 8/1978 | Bicek |
| D249,883 S | 10/1978 | Collins |
| 4,124,030 A | 11/1978 | Roberts |
| 4,151,578 A | 4/1979 | Bell |
| 4,158,217 A | 6/1979 | Bell |
| 4,158,810 A | 6/1979 | Leskovar |
| 4,177,496 A | 12/1979 | Bell et al. |
| 4,198,595 A | 4/1980 | Milkovic |
| 4,207,604 A | 6/1980 | Bell |
| 4,215,278 A | 7/1980 | Barbier et al. |
| 4,227,419 A | 10/1980 | Park |
| 4,241,237 A | 12/1980 | Paraskevakos et al. |
| 4,249,264 A | 2/1981 | Crochet et al. |
| 4,250,449 A | 2/1981 | Shum |
| 4,253,336 A | 3/1981 | Pietzuch |
| 4,258,348 A | 3/1981 | Belfer et al. |
| 4,297,741 A | 10/1981 | Howell |
| 4,328,903 A | 5/1982 | Baars |
| 4,354,155 A | 10/1982 | Speidel et al. |
| 4,359,672 A | 11/1982 | Hart |
| 4,362,580 A | 12/1982 | Kane et al. |
| 4,363,061 A | 12/1982 | Vaerewyck et al. |
| 4,371,814 A | 2/1983 | Hannas |
| 4,373,392 A | 2/1983 | Nagamoto |
| 4,384,289 A | 5/1983 | Stillwell et al. |
| 4,386,280 A | 5/1983 | Ricaud et al. |
| 4,388,668 A | 6/1983 | Bell et al. |
| 4,393,714 A | 7/1983 | Schmidt |
| 4,398,426 A | 8/1983 | Park et al. |
| 4,408,175 A | 10/1983 | Nelson et al. |
| 4,413,193 A | 11/1983 | Crockett |
| 4,413,230 A | 11/1983 | Miller |
| 4,426,673 A | 1/1984 | Bell et al. |
| 4,432,238 A | 2/1984 | Tward |
| 4,491,790 A | 1/1985 | Miller |
| 4,492,919 A | 1/1985 | Milkovic |
| 4,495,463 A | 1/1985 | Milkovic |
| 4,506,199 A | 3/1985 | Asche |
| 4,558,310 A | 12/1985 | McAllise |
| 4,558,595 A | 12/1985 | Kompelien |
| 4,574,266 A | 3/1986 | Valentine |
| 4,605,883 A | 8/1986 | Cockroft |
| 4,621,532 A | 11/1986 | Takagi et al. |
| 4,660,407 A | 4/1987 | Takami et al. |
| 4,709,339 A | 11/1987 | Fernandes |
| 4,722,047 A * | 1/1988 | Chan ............... G06F 12/0292 |
| | | 711/201 |
| 4,739,229 A | 4/1988 | Heiler, Jr. |
| 4,746,809 A | 5/1988 | Coleman et al. |
| 4,754,365 A | 6/1988 | Kazahaya |
| 4,757,416 A | 7/1988 | Wilkerson |
| 4,758,774 A | 7/1988 | Crawford et al. |
| 4,758,962 A | 7/1988 | Fernandes |
| 4,783,748 A | 11/1988 | Swarztrauber et al. |
| 4,794,327 A | 12/1988 | Fernandes |
| 4,808,910 A | 2/1989 | Kessi |
| D301,331 S | 5/1989 | Rhodin |
| 4,851,803 A | 7/1989 | Hahn |
| 4,855,671 A | 8/1989 | Fernandes |
| 4,874,904 A | 10/1989 | DeSanti |
| 4,885,655 A | 12/1989 | Springer et al. |
| 4,887,018 A | 12/1989 | Libert |
| 4,890,318 A | 12/1989 | Crane et al. |
| 4,894,770 A * | 1/1990 | Ward et al. ................. 711/128 |
| 4,926,105 A | 5/1990 | Mischenko et al. |
| 4,939,451 A | 7/1990 | Baran et al. |
| 4,944,187 A | 7/1990 | Frick et al. |
| 4,956,588 A | 9/1990 | Ming |
| 4,970,476 A | 11/1990 | Kitagawa |
| 4,972,167 A | 11/1990 | Fujioka |
| 4,991,050 A | 2/1991 | Heberlein, Jr. et al. |
| 4,992,709 A | 2/1991 | Griffin |
| 4,999,575 A | 3/1991 | Germer |
| 5,003,278 A | 3/1991 | May |
| 5,006,846 A | 4/1991 | Granville |
| 5,014,908 A | 5/1991 | Cox |
| 5,039,970 A | 8/1991 | Cox |
| 5,051,601 A | 9/1991 | Atobe et al. |
| 5,066,904 A | 11/1991 | Bullock |
| 5,079,510 A | 1/1992 | Komatsu et al. |
| D323,815 S | 2/1992 | Boutellier |
| 5,099,193 A | 3/1992 | Moseley et al. |
| 5,122,735 A | 6/1992 | Porter et al. |
| 5,148,348 A | 9/1992 | White |
| 5,181,026 A | 1/1993 | Granville |
| 5,196,784 A | 3/1993 | Estes, Jr. |
| D335,488 S | 5/1993 | Suzuki et al. |
| 5,223,790 A | 6/1993 | Baran et al. |
| 5,249,231 A * | 9/1993 | Covey et al. ................. 711/163 |
| 5,267,122 A | 11/1993 | Glover et al. |
| 5,296,819 A | 3/1994 | Kuroiwa et al. |
| 5,311,138 A | 5/1994 | Ott et al. |
| 5,317,274 A | 5/1994 | Nakagawa et al. |
| 5,323,256 A | 6/1994 | Banks |
| 5,337,206 A | 8/1994 | Kadah et al. |
| 5,359,273 A | 10/1994 | Fluckiger |
| 5,365,462 A | 11/1994 | McBean |
| 5,375,213 A * | 12/1994 | Arai ............................ 711/208 |
| 5,377,128 A | 12/1994 | McBean |
| D354,945 S | 1/1995 | Dellavecchia et al. |
| 5,385,060 A | 1/1995 | Wang |
| 5,391,983 A | 2/1995 | Lusignan et al. |
| 5,397,970 A | 3/1995 | Rowlette et al. |
| 5,410,920 A | 5/1995 | Westwick |
| 5,426,360 A | 6/1995 | Maraio et al. |
| 5,430,438 A | 7/1995 | Joos et al. |
| 5,444,183 A | 8/1995 | Gehrs et al. |
| 5,450,765 A | 9/1995 | Stover |
| 5,467,012 A | 11/1995 | Nystrom |
| 5,471,359 A | 11/1995 | Simpson et al. |
| 5,473,234 A | 12/1995 | Richardson |
| 5,502,374 A | 3/1996 | Cota |
| 5,548,209 A | 8/1996 | Lusignan et al. |
| 5,560,032 A * | 9/1996 | Nguyen ............... G06F 9/30101 |
| | | 712/217 |
| 5,563,506 A | 10/1996 | Fielden et al. |
| 5,572,073 A | 11/1996 | Burgess et al. |
| 5,578,927 A | 11/1996 | Perelle |
| 5,592,989 A | 1/1997 | Lynn et al. |
| 5,596,652 A | 1/1997 | Piatek et al. |
| 5,604,315 A | 2/1997 | Briefer et al. |
| 5,612,499 A | 3/1997 | Andrew et al. |

(56) References Cited

U.S. PATENT DOCUMENTS

| | | | |
|---|---|---|---|
| 5,652,860 A * | 7/1997 | Sato | 711/154 |
| 5,677,476 A | 10/1997 | McCarthy et al. | |
| 5,705,989 A | 1/1998 | Cota et al. | |
| 5,712,558 A | 1/1998 | Saint-Cyr et al. | |
| 5,753,983 A | 5/1998 | Dickie et al. | |
| 5,784,249 A | 7/1998 | Pouliot | |
| 5,802,605 A * | 9/1998 | Alpert et al. | 711/208 |
| 5,808,846 A | 9/1998 | Holce et al. | |
| 5,822,778 A * | 10/1998 | Dutton et al. | 711/208 |
| 5,844,138 A | 12/1998 | Cota | |
| 5,861,683 A | 1/1999 | Engel et al. | |
| 5,880,677 A | 3/1999 | Lestician | |
| 5,880,918 A | 3/1999 | Horbelt et al. | |
| 5,905,439 A | 5/1999 | Mcintyre | |
| 5,909,087 A | 6/1999 | Bryde et al. | |
| 5,920,190 A | 7/1999 | Peterson et al. | |
| 5,920,191 A | 7/1999 | Maniero et al. | |
| 5,922,939 A | 7/1999 | Cota | |
| 5,994,892 A | 11/1999 | Turino et al. | |
| 5,995,911 A | 11/1999 | Hart | |
| 6,005,760 A | 12/1999 | Holce et al. | |
| D419,964 S | 2/2000 | Holce et al. | |
| 6,020,702 A | 2/2000 | Farr | |
| 6,029,524 A | 2/2000 | Klauder et al. | |
| 6,044,430 A | 3/2000 | MacDonald | |
| 6,046,550 A | 4/2000 | Ference et al. | |
| 6,064,192 A | 5/2000 | Redmyer | |
| 6,091,023 A | 7/2000 | O'Donnell | |
| 6,122,972 A | 9/2000 | Crider | |
| 6,124,791 A | 9/2000 | Wolf | |
| D431,534 S | 10/2000 | Holce et al. | |
| 6,133,709 A | 10/2000 | Puchianu | |
| 6,133,723 A | 10/2000 | Feight | |
| 6,137,418 A | 10/2000 | Zuercher et al. | |
| 6,146,109 A | 11/2000 | Davis et al. | |
| 6,219,216 B1 | 4/2001 | Holce et al. | |
| 6,236,949 B1 | 5/2001 | Hart | |
| 6,269,317 B1 | 7/2001 | Schachner et al. | |
| 6,308,140 B1 | 10/2001 | Dowling et al. | |
| 6,330,516 B1 | 12/2001 | Kammeter | |
| 6,331,821 B1 | 12/2001 | Holce et al. | |
| 6,336,180 B1 * | 1/2002 | Long | G06F 9/3879 711/206 |
| 6,344,951 B1 | 2/2002 | Sato et al. | |
| 6,351,206 B1 | 2/2002 | Schweiger et al. | |
| 6,373,238 B2 | 4/2002 | Lewis et al. | |
| 6,377,430 B2 | 4/2002 | Holce et al. | |
| 6,380,696 B1 | 4/2002 | Sembhi et al. | |
| 6,384,946 B1 | 5/2002 | Pitsch et al. | |
| 6,404,166 B1 | 6/2002 | Puchianu | |
| 6,414,241 B1 | 7/2002 | O'Donnell | |
| 6,430,651 B1 * | 8/2002 | Isobe | 711/104 |
| D466,078 S | 11/2002 | Bowman | |
| 6,496,378 B2 | 12/2002 | Holce et al. | |
| 6,504,357 B1 | 1/2003 | Hemminger et al. | |
| 6,504,695 B1 | 1/2003 | Holce et al. | |
| 6,549,859 B1 | 4/2003 | Ward | |
| 6,591,482 B1 | 7/2003 | Fleege et al. | |
| D478,313 S | 8/2003 | Bowman | |
| 6,615,147 B1 | 9/2003 | Jonker et al. | |
| 6,636,028 B2 | 10/2003 | Lavoie et al. | |
| 6,657,424 B1 | 12/2003 | Voisine et al. | |
| 6,658,578 B1 * | 12/2003 | Laurenti et al. | 713/324 |
| 6,724,600 B2 | 4/2004 | Holce et al. | |
| 6,737,854 B2 | 5/2004 | Bruno et al. | |
| 6,756,776 B2 | 6/2004 | Perkinson et al. | |
| 6,774,803 B1 | 8/2004 | Tiffin | |
| 6,809,509 B2 | 10/2004 | Bruno et al. | |
| 6,815,942 B2 | 11/2004 | Randall et al. | |
| 6,825,771 B2 | 11/2004 | Bruno et al. | |
| 6,856,515 B2 | 2/2005 | Holce et al. | |
| 6,861,683 B2 | 3/2005 | Rissing et al. | |
| 6,871,827 B2 | 3/2005 | Petak et al. | |
| 6,888,712 B2 | 5/2005 | Holce et al. | |
| 6,889,271 B1 | 5/2005 | Germer et al. | |
| 6,937,003 B2 | 8/2005 | Bowman et al. | |
| 6,950,292 B2 | 9/2005 | Holce et al. | |
| 6,988,043 B1 | 1/2006 | Randall | |
| 7,006,934 B2 | 2/2006 | Jonker et al. | |
| 7,053,497 B2 | 5/2006 | Sodemann et al. | |
| 7,157,899 B2 | 1/2007 | Bruno | |
| 7,161,345 B2 | 1/2007 | Bruno | |
| 7,174,261 B2 | 2/2007 | Gunn et al. | |
| 7,193,428 B1 | 3/2007 | Baron et al. | |
| 7,212,930 B2 | 5/2007 | Bruno | |
| 7,221,145 B2 | 5/2007 | Bowman et al. | |
| 7,230,414 B2 | 6/2007 | Bruno | |
| 7,239,810 B2 | 7/2007 | Seely et al. | |
| 7,274,187 B2 | 9/2007 | Loy | |
| 7,282,889 B2 | 10/2007 | Freed et al. | |
| 7,310,049 B2 | 12/2007 | Bowman | |
| 7,312,686 B2 | 12/2007 | Bruno | |
| 7,313,668 B2 * | 12/2007 | Worley | 711/207 |
| 7,330,022 B2 | 2/2008 | Bowman et al. | |
| 7,333,345 B2 | 2/2008 | Holce et al. | |
| 7,352,287 B2 | 4/2008 | Rupert | |
| 7,359,809 B2 | 4/2008 | Bruno | |
| 7,362,232 B2 | 4/2008 | Holle et al. | |
| 7,447,603 B2 | 11/2008 | Bruno | |
| 7,474,088 B2 | 1/2009 | Bowman et al. | |
| 8,212,548 B2 | 7/2012 | Parker et al. | |
| 8,255,615 B1 * | 8/2012 | Yoon et al. | 711/103 |
| 2003/0005071 A1 * | 1/2003 | Kanoh | G06F 15/17 709/213 |
| 2004/0183522 A1 | 9/2004 | Gunn et al. | |
| 2004/0227503 A1 | 11/2004 | Bowman et al. | |
| 2005/0216642 A1 * | 9/2005 | Lee | G06F 12/0292 710/308 |
| 2005/0240362 A1 | 10/2005 | Randall | |
| 2006/0085144 A1 | 4/2006 | Slota et al. | |
| 2006/0103548 A1 | 5/2006 | Borkowski et al. | |
| 2006/0164096 A1 | 7/2006 | Kwon | |
| 2006/0181242 A1 | 8/2006 | Freed et al. | |
| 2007/0157001 A1 * | 7/2007 | Ritzau | G06F 12/08 711/170 |
| 2009/0043948 A1 * | 2/2009 | Wittenburg et al. | 711/103 |
| 2009/0049222 A1 * | 2/2009 | Lee et al. | 710/300 |
| 2009/0115400 A1 | 5/2009 | Hunter | |
| 2009/0115620 A1 | 5/2009 | Hunter | |
| 2011/0156698 A1 | 6/2011 | Cook | |
| 2012/0089808 A1 * | 4/2012 | Jang et al. | 711/206 |

OTHER PUBLICATIONS

Description of KT® 6300, 6400 Split-Core kW/kWH Transducers . . . Enercept KT®, 1 page by Hawkeye® (by Veris Industries, Inc.), at least one year prior to filing date (1997) (unavailable month).

Ganssie, "Interrupt Latency," Embedded.com, Article.. jhmtl?articleID=9900320, Aug. 26, 2004 <www.embedded.com/show>.

* cited by examiner

| Integer Register | Channel | Description |
|---|---|---|
| 1336 | 1 | Current |
| 1337 | 2 | Current |
| 1338 | 3 | Current |
| ⋮ | ⋮ | ⋮ |

FIG. 4

| Integer Register | Channel | Description |
|---|---|---|
| 1336 | 1 | Page register = 1 → reports current  ← 123 |
| | | Page register = 2 → reports power  ← 124 |
| | | Page register = 3 → reports power factor  ← 126 |
| | | Page register = 4 → reports energy  ← 128 |
| 1337 | 2 | Page register = 1 → reports current |
| | | Page register = 2 → reports power |
| | | Page register = 3 → reports power factor |
| | | Page register = 4 → reports energy |
| ⋮ | ⋮ | ⋮ |
| 9999 | | Sets page that general register points to: Page = X |

FIG. 5

BRANCH CIRCUIT MONITOR WITH PAGING REGISTER

CROSS-REFERENCE TO RELATED APPLICATIONS

This application claims the benefit of U.S. Provisional App. No. 61/479,549, filed Apr. 27, 2011.

BACKGROUND OF THE INVENTION

The present invention relates a branch circuit monitor and, more particularly, to a branch circuit monitor having memory including a paging register.

The total power consumption of a building or other facility is typically monitored by the electric utility with a power meter located between the utility's distribution transformer and the facility's power distribution panel. However, in many instances it is desirable to sub-meter or attribute the facility's power usage and cost to different occupancies, buildings, departments, or cost centers within the facility or to monitor the power consumption of individual loads or groups of loads, such as motors, lighting, heating units, cooling units, etc. These single phase or multi-phase electrical loads are typically connected to one or more of the branch circuits that extend from the facility's power distribution panel.

While a power meter may be installed at any location between a load and the distribution panel, typically a power meter capable of monitoring a plurality of circuits is installed proximate the power distribution panel to provide centralized monitoring of the various loads powered from the panel. For example, while the voltage transducer(s) of a power meter can be interconnected anywhere in the wiring that connects the supply and a load, including at the load's terminals, the power distribution panel provides a convenient location for connecting the voltage transducers because typically each phase of the power is conducted by a separate bus bar in the power distribution panel and the voltage and phase is the same for all loads attached to the respective bus bar. The voltage transducers of digital power meters commonly comprise voltage divider networks that are connected to a bus bar or other conductor in which the voltage will be measured.

The current transducers typically comprise current transformers that encircle the respective power cables that interconnect each branch circuit to the bus bar(s) of the distribution panel. A current transformer typically comprises multiple turns of wire wrapped around the cross-section of a toroidal core. The power cable, conducting the current to be measured, is passed through the aperture in the center of the toroidal core and constitutes the primary winding of the transformer. The wire wrapped around the cross-section of the core comprises the secondary winding of the transformer. Current flowing in the primary winding (primary current) induces a secondary voltage and current in the secondary winding which is quantitatively related to the current in the primary winding. The secondary winding is typically connected to a resistor network and the magnitude of the primary current can be determined from the amplitude of the voltage at the output of the resistor network.

Flexibility has favored adoption of digital current and power meters, known as branch circuit monitors, incorporating data processing systems typically comprising one or more microprocessors or digital signal processors (DSP) that periodically read the output of each of the voltage and current transducers, calculate the current or voltage at the respective transducer and display or store the results. In addition, the data processing unit periodically may calculate the power and other electrical parameters, such as active power, apparent power and reactive power that quantify electricity distribution and consumption. The calculated parameters are typically output to a display for immediate viewing and/or transmitted from a communications interface to another data processing system, such as a building management computer for remote display or further processing, for example formulating instructions to automated building equipment.

Branch circuit monitors are commonly incorporated in networks that utilize the MODBUS® serial communication protocol. The MODBUS protocol, first published in 1979, enables serial communication between up to 247 interconnected network devices and has become a de facto standard communications protocol for connecting industrial electronic devices. Each device is given a unique address and each query contains the address of the intended device. A device will not respond to a query unless it contains that device's address. A basic MODBUS query can control or read an input/output port of a receiving device or instruct the receiving device to change or send back one or more values contained in its memory.

While the MODBUS protocol is a de facto standard for industrial electronic devices, it does have its limitations. For example, since MODBUS was developed in the 1970s to communicate with programmable logic controllers (PLCs), the number of supported data types is limited to those utilized by PLCs at that time and does not include large binary objects. Also, the number of addressable registers in a MODBUS device is limited which can affect the device's performance and utility. For example, a branch circuit monitor monitoring a large number of circuits and determining several electrical measurement parameters for each circuit generates substantial amounts of data and the limited number of addressable registers can limit the number of circuits monitored by the branch circuit monitor and/or the types of data that can be produced and communicated by the monitor. What is desired, therefore, is a MODBUS network connectable branch circuit monitor with increased addressable memory.

BRIEF DESCRIPTION OF THE DRAWINGS

FIG. 4 is an exemplary MODBUS point map for a device with standard MODBUS addressing.

FIG. 5 is an exemplary MODBUS point map for a device with MODBUS device with paged memory and a page register.

DETAILED DESCRIPTION OF PREFERRED EMBODIMENTS

Figure 1:
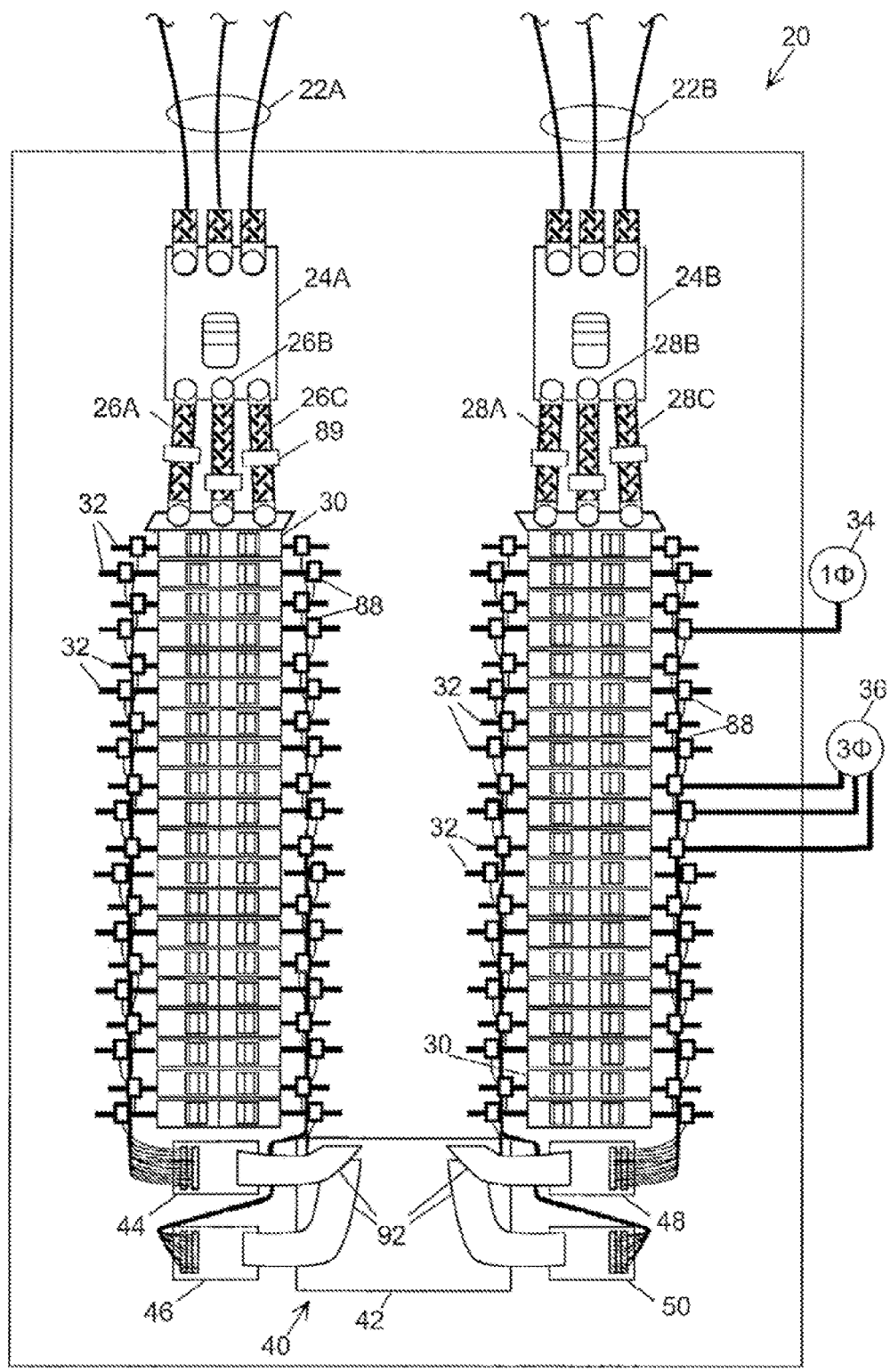
FIG. 1 is front view of an electric power distribution panel including a branch circuit monitor.

Electricity delivered by the local utility to a facility's mains is distributed to the various loads in the facility by branch circuits which are conductively connected to the mains at a distribution panel. Referring in detail to the drawings where similar parts are identified by like reference numerals, and, more particularly to FIG. 1, an exemplary distribution panel 20 includes two three-phase mains 22A, 22B which are respectively connected to main circuit breakers 24A, 24B. Each of the phases of each main is connected to a respective bus bar 26A, 26B, 26C and 28A, 28B, 28C. Three of the bus bars extend behind each of two rows of branch circuit breakers 30 that respectively conductively connect one of the bus bars to a branch circuit conductor 32 which is conductively connected to the load(s) of the branch circuit. A single phase load, for example, load 34, is conductively connected to single bus bar. A two-phase load is connected, typically through two adjacent circuit breakers in the same row, to two bus bars conducting different phases of the power. A three-phase load, for example, load 36, is connected, typically through three adjacent circuit breakers in the same row, to three bus bars each conducting a different phase of the electricity.

A digital branch circuit monitor 40 is often installed in an electrical distribution panel, such as the exemplary distribution panel 20, to monitor the current or the current and the voltage in the circuits served by the panel. For example, a digital branch circuit monitor produced by Veris Industries, Inc. can monitor the current or the power (current and voltage) in up to 84 branch circuits and two three-phase mains of a power distribution panel and can determine, in addition to voltage and current, a number of other parameters related to energy consumption for each circuit served by the distribution panel. Data updates occur approximately every two seconds and an alarm may be triggered by the monitor if the operation of a circuit approaches a user configured threshold. The exemplary branch circuit monitor 40 comprises a main acquisition board 42 and four adapter boards 44, 46, 48, 50 facilitating interconnection of the measuring circuitry and the transducers which sense current and voltage in the various conductors of the distribution panel.

Figure 2:
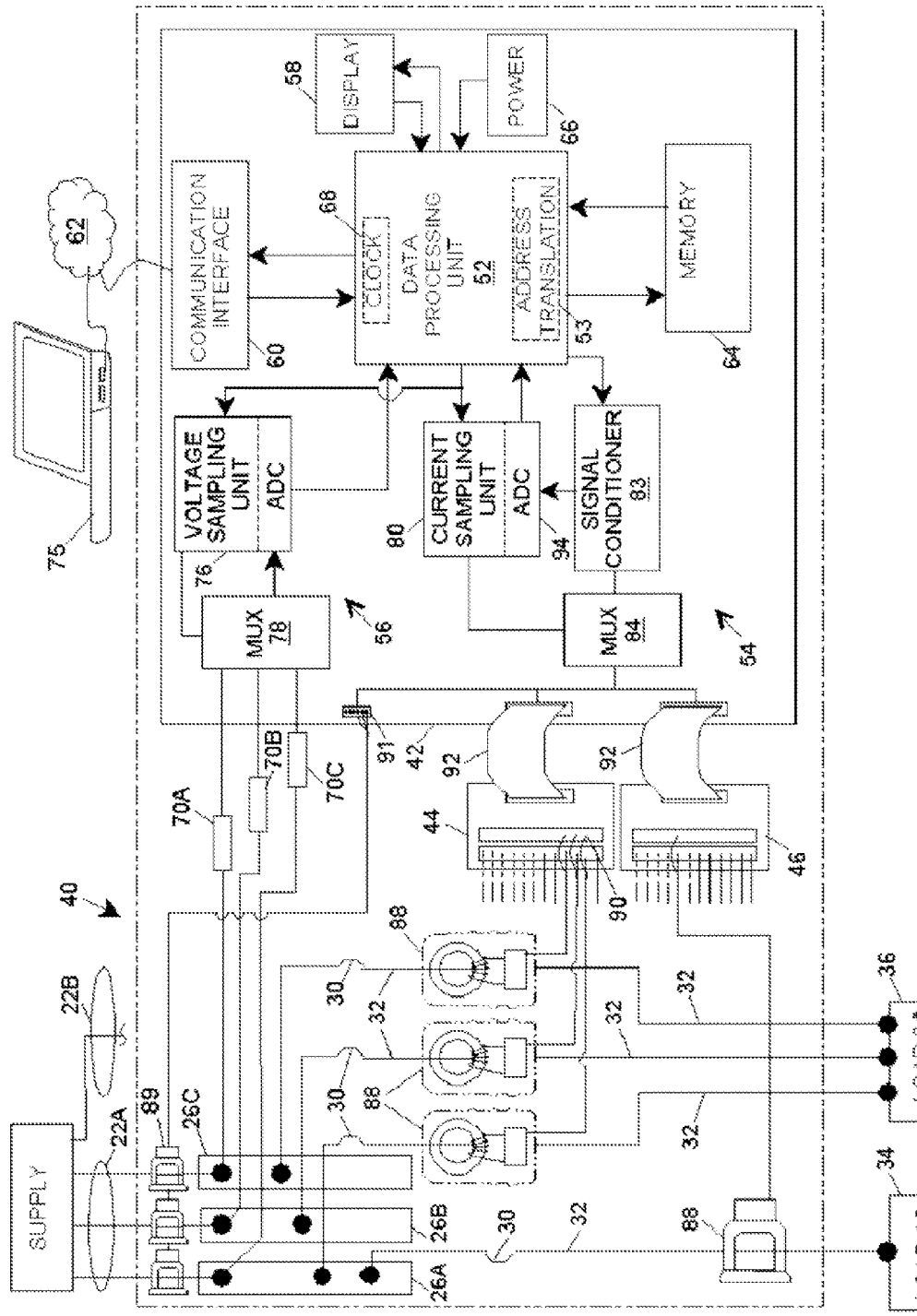
FIG. 2 is a schematic diagram of a branch circuit monitor.

Referring also to FIG. 2, the exemplary digital branch circuit monitor 40 is arranged to monitor the both voltage and current in a plurality of branch circuits and comprises, generally, a data processing unit 52, a current measuring section 54 and a voltage measuring section 56. The data processing unit 52 typically comprises at least one microprocessor or digital signal processor (DSP). The data processing unit 52 periodically reads and stores data from the voltage 56 and the current 54 measuring sections, and uses that data to calculate the current, voltage, power and other electrical parameters that are the meter's output. The calculated values may be output to a display 58 for viewing at the meter or output to a communications interface 60 for transmission via a communication network 62 to another data processing system 75, such as a building management computer, for remote display or use in automating or managing the facility's operations. A memory 64 in which the software for the data processing unit and data manipulated by the data processing unit may be stored is associated with the data processing unit. A power supply 66 provides power to the data processing unit and to the voltage and current measuring sections. One or more clocks 68, which may be incorporated into the data processing unit, time intervals between the occurrences of monitored events.

The voltage measuring section 56 includes one or more voltage transducers 70A, 70B, 70C each typically comprising a resistor network, a voltage sampling unit 76 to sample the output of the voltage transducers and convert the analog measurements to digital data suitable for use by the data processing unit and a multiplexer 78 that periodically connects the voltage sampling unit to a selected one of the voltage transducers enabling periodic sampling of the magnitude of the voltage at each voltage transducer. Typically, each phase of the electricity supplied to a distribution panel is connected to a bus bar, for example, bus bars 26A, 26B, 26C, and each branch circuit breaker 30 connectively interconnects one of the bus bars to a branch circuit conductor 32. One or more of the branch circuit conductors are conductively connected to each of the facility's loads, for examples, loads 34, 36. Since the voltage and phase supplied to all commonly connected loads is the same, a meter for measuring three-phase power typically includes at least three voltage transducers 70A, 70B, 70C each connected to one of the bus bars 26A, 26B, 26C that is conducting a different phase of the power from one of the mains, for example, main 22A.

The current measuring section 54 comprises a current sampling unit 80, a multiplexer 84, a signal conditioning unit 83 and a plurality of current transducers each representing data channel in the branch circuit monitor. The current transducers are preferably current transformers but other types of current sensors might be used. Current monitoring with a current transformer requires a current transformer for each of the conductors in which the current is to be monitored. In the exemplary branch circuit monitor 40 a current transformer 89 senses the current in each of the panel's mains and a branch current transducer 88 senses the current in each of the panel's branch circuit conductors 32.

The auxiliary current transformers 89 monitoring the current in the mains are connected to a terminal block 91 on the main circuit board. Each terminal of the terminal block 91 is conductively connected to the multiplexer 84. For convenience, each of the branch current transducers 88 may be respectively connected to a sensor position 90 on one of the adapter boards, 44, 46, 48, 50. A multi-conductor cable 92 communicatively connects each of the sensor positions of each of the adapter boards to the multiplexer 84 on the main circuit board 42. The multiplexer 84 is connected to a signal conditioning unit 83 which is, in turn, conductively connected to an analog-to-digital converter 94 of the current sampling unit 80. In response to a timing signal from the clock 68, the multiplexer sequentially connects each sensor position and each terminal block connection to the signal conditioning unit and, thereby, the analog-to-digital converter which outputs to the data processing unit 52 a digital signal representing a sample output of the respective current transducer.

Instantaneous values of the sinusoidal analog voltage and current waveforms are digitally captured by periodically, sampling the amplitudes of the outputs of respective voltage and current transducers. The data processing unit calculates the current in the power cable monitored by a current transducer from the characteristics of the transducer and a plurality of sample outputs of the transducer accumulated over a period of time. The "effective," "real" or "active" power is approximated by averaging the sum of the products of temporally corresponding instantaneous samples of the voltage and current for each of the plurality of sampling intervals making up at least one cycle of the sinusoidal waveform:

$$P \cong \frac{1}{T} \sum_{k=1}^{k=\frac{T}{\Delta t}} v(k)i(k)\Delta t$$

where:
P=effective power
v(k)=sample voltage for the k-th sample, for example voltage 24
i(k)=sample current for the k-th sample, for example current 26
Δt=sampling interval However, users of branch circuit monitors are often interested in a number of parameters related to electricity distribution in addition to the voltage, current and effective power for the facility and each of its branch circuits. For examples, the reactive power, the portion of the total power that is temporarily stored in the form of electric and magnetic fields due to inductive and capacitive elements in a circuit, influences the voltage levels in a transmission network and must be controlled along with the voltage to allow an electrical power system to be operated within acceptable limits. The power factor of an alternating current (AC) circuit is the ratio of real power, the capacity of a circuit to do work, flowing to the load and the apparent power, the product of the voltage and current in the circuit. Non-linear loads such as rectifiers; arc discharge devices, such as fluorescent lighting or electric welders, and switched-mode power supplies reduce the power factor and increase the number volt-amperes that must be supplied for a given amount of work. Many users desire that the data processing unit of the branch circuit monitor compute a number of these electrical parameters in addition to determining the voltage, current and effective power and transmit this information to other networked data processing devices utilizing the MODBUS® communication protocol.

The MODBUS communication protocol was developed and published in 1979 for use with Modicon® programmable logic controllers (PLCs). MODBUS is an open serial communication protocol and has become a standard communication protocol for connecting industrial electronic devices. The MODBUS protocol is commonly used to transmit signals from control devices and instrumentation, such as a branch circuit monitor, to a main controller and/or a data aggregating system. The device requesting information or writing information is called the MODBUS master and the devices supplying or reading the information are known as MODBUS slaves. In a standard MODBUS network there is at least one master and up to 247 slaves, each with a unique address. Masters can broadcast a message, known as a query, to all slaves or it can address a query to an individual slave. When the master requests or writes data to a slave, the first byte of the message is the address of intended slave. A slave only responds to queries containing its address and does not respond to queries directed to other addressees or to broadcast queries.

In a MODBUS slave device, information is stored in four tables, each having 9999 entries. Two tables, one a read-only table and one a write only table, store discrete on/off values, referred to as "coils." Similarly, a read-only table and a write-only table store numerical values in data spaces known as "registers." Referring to FIG. 4, a MODBUS point map 100 for a standard MODBUS slave device lists the register numbers 102 and a description 104 of the data stored in the respective registers. In addition, the point map may list the data type and the source of the data, in the case of a branch circuit monitor, the channel 100 or meter number corresponding to a particular circuit monitored by the meter. While the number of registers in a standard MODBUS device is adequate for many applications, it can be limiting for a branch circuit monitor that measures electricity in a large number of circuits and calculates a number of different electrical parameters for each of the monitored circuits.

Some MODBUS devices can utilize extended register addressing to increase the addressable memory of the device. The output registers of a standard MODBUS device have addresses ranging from 0000 to 270E (hexadecimal), but up to 65,500 registers can be addressed by extending register addressing with addresses from 207F to FFFF. However, all devices in a MODBUS network must utilize the same register addressing and many software drivers for MODBUS master computers and many slave devices do not support extended register addressing. The present inventor considered the limitations presented by the number of standard MODBUS register addresses and concluded that the addressable memory of a branch circuit monitor in a MODBUS network utilizing standard MODBUS addressing could be expanded by implementing a paging register in the memory of the branch circuit monitor.

Referring to the MODBUS point map 120 of FIG. 5 for the branch circuit monitor 40 with paging memory, each MODBUS register 122 may comprise a plurality of pages, for example pages 123, 124, 125, 126. Each page corresponds to a data space in the memory 64 in which data is stored. For examples, registers 1336 and 1337 each comprise four pages each page containing a different data element for the respective channel 130 represented by the register.

For the purpose of the example, the data stored in the data space corresponding to page 1 (123) expresses the magnitude of the current in the respective channel; page 2 (124), the magnitude of the power, page 3 (126), the magnitude of the power factor and page 4 (128) contains data expressing the magnitude of the energy in the respective channel. In addition to data to be reported to the MODBUS master, any data useful to the data processing unit of the branch circuit monitor may be stored in the paged memory. For example, intermediate data which may or may not be reported to the master, such as the product of the current and the square root of 3, might be stored in one of the data spaces of the paged memory for use by the data processing unit 52 during a calculation.

Figure 3:
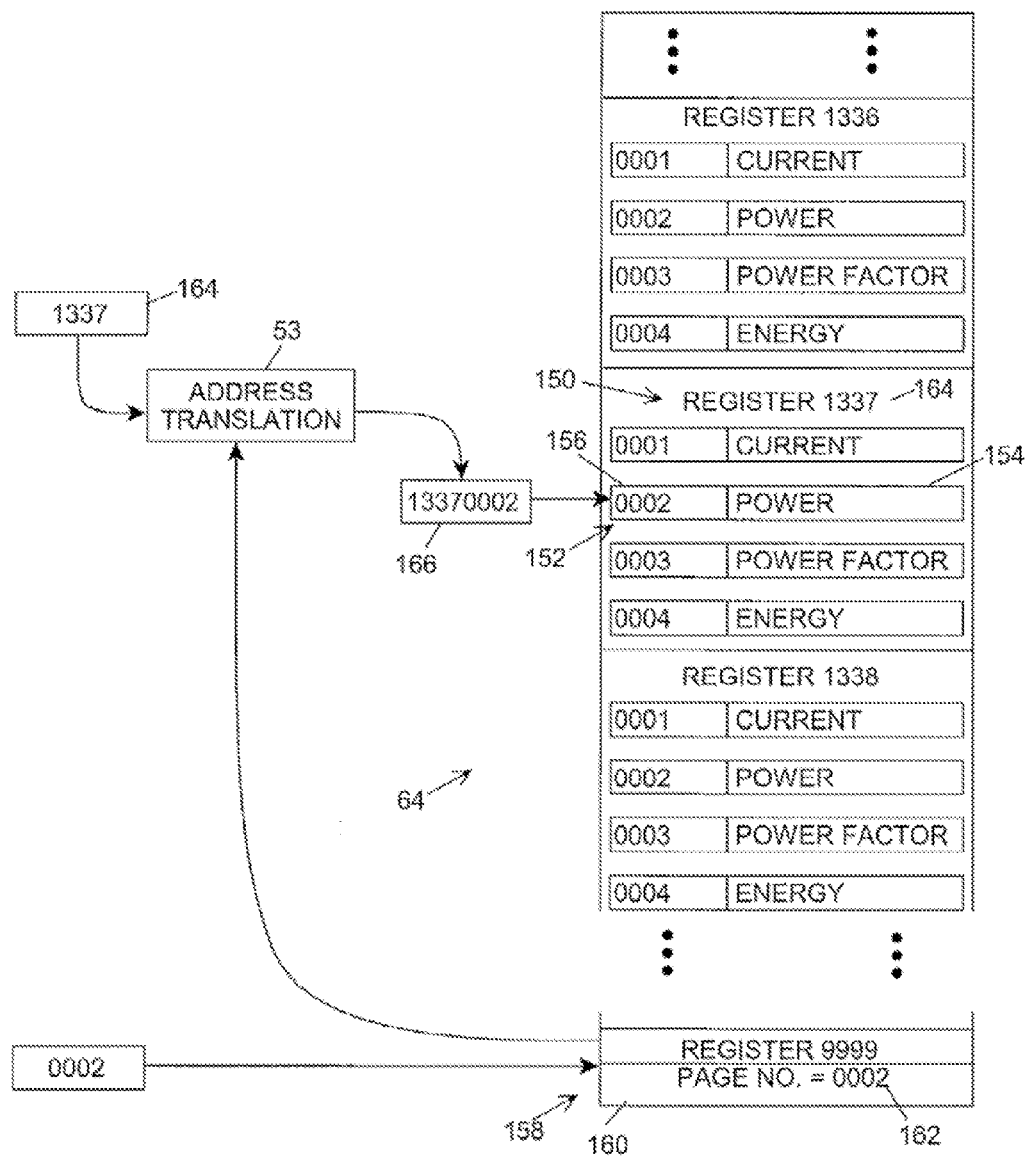
FIG. 3 is a block diagram of transaction with a paged memory including a page register.

Referring to FIG. 3, the memory 64 of the branch circuit monitor 40 is logically divided into a plurality register spaces 150 corresponding to the registers 122 included in the MODBUS point map. The register spaces are logically divided into a plurality of addressable page spaces, for example, page space 152 each including a data space 154 in which page data is stored and a corresponding physical address or data address 156 which is used by the data processing unit 52 to access the data space and either store data in or read data from the data space. While contiguous register spaces and pages spaces are illustrated in FIG. 3, the register pages and/or the data may not be physically contiguous in the memory.

The memory 64 also includes a paging register 158 including a data space 160 in which a page number 162 is stored. When the data processing unit 52 of the branch circuit monitor 40 accesses the paged memory to store or retrieve data, it first sets the page number 162 in the page register 158, For example, to access the power data in channel 2, the data processing unit first sets the page number 162 in the page register 158 to 0002. Then the data processing unit loads the register identification 164, 1337, and the page number 162, 0002, from the page register into an address translator 53 which may be part of the data processing unit 52. The address translator determines the physical or data address 166 in the memory for page 2 of register 1337 and the data processing unit accesses the data in the data space 154 corresponding to that page.

When the MODBUS master 75 queries the branch circuit monitor for data in one of the registers, it sends a query to the data processing unit 52 specifying the page number of the desired data. If for example, the MODBUS master is requesting that the branch circuit monitor report the value of the power in channel 2, the master sends a query to the branch circuit monitor directing the data processing unit to set the page number value 162 to 0002 and store the page number in the page register. The master transmits a query containing the register number(s) to be read by data processing unit of the branch circuit monitor and the address translator 53 uses the page number 162 from the page register 158 and the register number to determine the data address 166 of the corresponding data space 154 enabling the data processing unit to access the data contained in the appropriate data space.

The page register and memory paging substantially increase the data that can be accessed and reported with standard MODBUS network addressing.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

We claim:

1. A method of storing a datum in a non-transitory computer readable medium, said method comprising the steps of:
    (a) storing a page identification in a page register address space identified by an absolute register identifier among a set of available absolute register identifiers of said computer readable medium;
    (b) translating a register identification identifying one of said set of absolute register identifications and said page identification to a datum address in said computer readable medium to a page identified by said datum address that is not otherwise addressable by one of said available absolute register identifiers; and
    (c) storing said datum in said computer readable medium in a data storage space having said datum address in said page identified by said datum address that is not otherwise addressable, where all of said datum address capable of being created as a result of any said register identification and any said page identification results in a physical address in said computer readable medium that is not shared with any physical address in said computer readable medium of any other datum address, and as a result, of said storing said datum at said physical address in said computer readable medium, is not overwritten with a different datum prior to said storing from another storage and said datum is updated with a different datum as a result of receiving data from at least one of a current sensor and a voltage sensor.

2. The method of storing a datum of claim 1 wherein said register identification identifies a register space in said computer readable medium, said register space comprising a plurality of data storage spaces.

3. A method of retrieving a datum stored in a non-transitory computer readable medium, said method comprising the steps of:
    (a) storing a page identification in a page register address space identified by an absolute register identifier among a set of available absolute register identifiers of said computer readable medium;
    (b) translating a register identification identifying one of said set of absolute register identifications and said page identification to a datum address in said computer readable medium to a page identified by said datum address that is not otherwise addressable by one of said available absolute register identifiers; and
    (c) reading said datum stored in said computer readable medium at a storage space having said datum address in said page identified by said datum address that is not otherwise addressable, where all of said datum address capable of being created as a result of any said register identification and any said page identification results in a physical address in said computer readable medium that is not shared with any physical address in said computer readable medium of any other datum address, and as a result, of said reading said datum at said physical address in said computer readable medium, is not overwritten with a different datum prior to said reading from another storage and said datum is updated with a different datum as a result of receiving data from at least one of a current sensor and a voltage sensor.

4. The method of retrieving a datum of claim 3 wherein said register identification identifies a register space in said computer readable medium, said register space comprising a plurality of data storage spaces.

5. A method for communicating a datum from a first data processing unit to a second data processing unit, said method comprising the steps of:
    (a) transmitting a first message comprising a page identification to said first data processing unit;
    (b) storing said page identification in a page register address space identified by an absolute register identifier among a set of available absolute register identifiers of a non-transitory medium readable by said first data processing unit;
    (c) transmitting an absolute register identification identifying one of a set of absolute register identifications to said first data processing unit;
    (d) translating said absolute register identification identifying said one of said set of absolute register identifications and said page identification to a datum address in said readable medium to a page identified by said datum address that is not otherwise addressable by one of said available absolute register identifiers; and
    (e) transmitting a datum stored in a data space corresponding to said datum address to said second data processing unit, where all of said datum address capable of being created as a result of any said register identification and any said page identification results in a physical address in said computer readable medium that is not shared with any physical address in said computer readable medium of any other datum address, and as a result, of said transmitting said datum at said physical address in said computer readable medium, is not overwritten with a different datum prior to said transmitting from another storage and said datum is updated with a different datum as a result of receiving data from at least one of a current sensor and a voltage sensor.

6. The method of communicating a datum of claim 5 wherein said register identification identifies a register space in said medium readable by said first data processing unit, said register space comprising a plurality of data storage spaces.

* * * * *